(12) United States Patent
Wickham et al.

(10) Patent No.: US 6,972,887 B2
(45) Date of Patent: Dec. 6, 2005

(54) HIGH ENERGY ARBITRARY WAVEFORM SOURCE

(75) Inventors: Michael G. Wickham, Rancho Palos Verdes, CA (US); Hiroshi Komine, Torrance, CA (US); Eric Cheung, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/734,042

(22) Filed: Dec. 11, 2003

(65) Prior Publication Data

US 2005/0128554 A1   Jun. 16, 2005

(51) Int. Cl.[7] ............................ H01S 3/00; G02B 26/00
(52) U.S. Cl. ...................................... 359/237; 359/239
(58) Field of Search .............................. 359/237, 239, 359/298; 385/4; 372/26, 9, 31

(56) References Cited

U.S. PATENT DOCUMENTS

| | | | |
|---|---|---|---|
| 6,147,755 A | 11/2000 | Heflinger | |
| 6,229,616 B1 | 5/2001 | Brosnan | |
| 6,243,168 B1 | 6/2001 | Heflinger | |
| 6,366,356 B1 | 4/2002 | Brosnan | |
| 6,671,298 B1 * | 12/2003 | Delfyett et al. | 372/26 |
| 6,724,783 B2 * | 4/2004 | Jalali et al. | 372/9 |
| 2002/0131164 A1 | 9/2002 | Palese | |

FOREIGN PATENT DOCUMENTS

EP   1 041 686   10/2000

OTHER PUBLICATIONS

International search Report for corresponding PCT/US2004/041352, completed Jul. 4, 2005 by S. Riechel of the EPO.
Yilmaz, T et al.: "Toward a Photonic Arbitrary Waveform Generator Using a Modelocked External Cavity Semiconductor Laser"; IEEE Photonics Technology Letters, vol. 14, No. 11, Nov. 2002 (2002-11), pp. 1608-1610, XP002334461, ISSN: 1041-1135, *the whole document*.
Anderegg, Jesse et al.: "8-Watt Coherently phased 4-Element Fiber Array"; Proc SPIE Int Soc Opt Eng; Proceedings of SPIE— The International Society for Optical Engineering 2003, vol.4974, Jul. 2003 (2003-07), pp. 1-6, XP002334462 *the whole document*.

* cited by examiner

Primary Examiner—Scott J. Sugarman
Assistant Examiner—Richard Hanig
(74) Attorney, Agent, or Firm—Noel F. Heal

(57) ABSTRACT

A high-energy optical beam generator providing a desired output waveform. The generator includes a master oscillator, such as a mode-locked laser, to generate an input beam, a first dispersive element to decompose the input beam into frequency components, a set of phase and amplitude modulators to modulate the frequency components individually, a set of power amplifiers to amplify the frequency components individually, and a second dispersive element to recombine the amplified and modulated frequency components into a single output beam. Phase control electronics control the modulators to provide the desired waveform for the output beam, based on its intended application and on sensed characteristics of the input beam and the output beam.

10 Claims, 4 Drawing Sheets

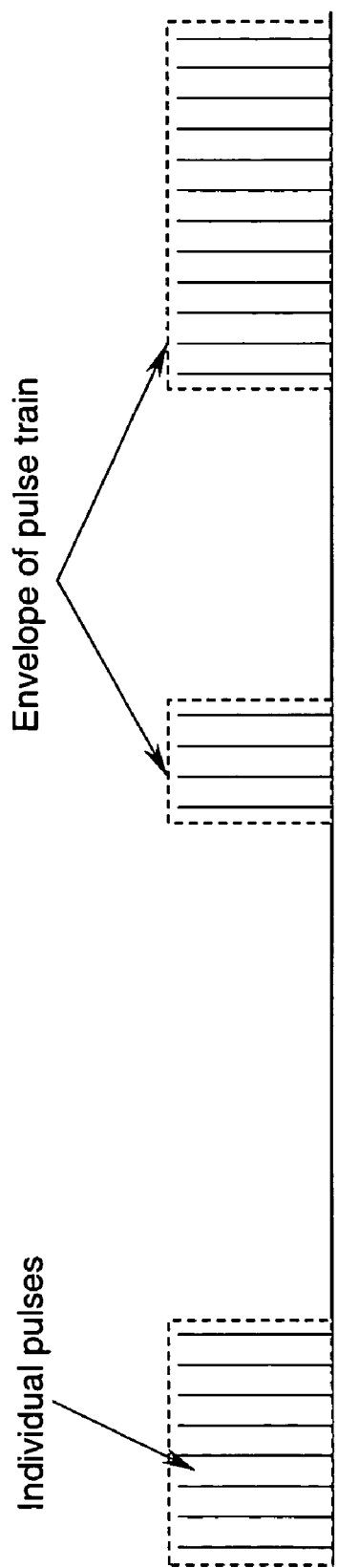

HIGH ENERGY ARBITRARY WAVEFORM SOURCE

This invention was made with Government support under contract number MDA972-02-C-0051 awarded by the Defense Advanced Research Projects Agency. The Government has certain rights in this invention.

BACKGROUND OF THE INVENTION

The present invention relates generally to optical radiation sources and, more particularly, sources of high-energy optical radiation having arbitrary or desired waveforms. In a number of applications, optical radiation with an arbitrary or desired waveform is needed, but typical sources for this purpose effect control of an optical output waveform by pulse suppression and have a relatively low electrical efficiency. Previously available optical sources also lack the ability to provide any desired waveform. The ability to control the waveform of a high-energy optical source has useful applications in laser welding, lidar (light detection and ranging, which is analogous to radar), and infrared countermeasures (IRCM). In the case of IRCM, using a source with low electrical efficiency results in increased weight, which may be unacceptable for airborne IRCM applications.

Accordingly, there has been a need for an optical radiation source of which the waveform can be selected to meet specific requirements of an application. The present invention satisfies this need.

SUMMARY OF THE INVENTION

The present invention resides in a high-energy optical source capable of producing any desired waveform. Briefly, and in general terms, the optical source comprises a source of input laser pulses; a first dispersive element, for decomposing the input laser pulses into multiple frequency components directed along multiple optical paths; multiple phase and amplitude modulators connected in the respective optical paths; multiple power amplifiers connected in the respective optical paths; a second dispersive element coupled to receive amplified optical signals from multiple power amplifiers and arranged to disperse light from the multiple optical paths along a single output optical axis, as a single amplified composite output beam; and means for controlling the multiple phase and amplitude modulators to produce desired properties in the amplified composite output beam.

The invention may also be defined as a method for generating a high-energy optical beam of any desired waveform. The method comprises the steps of generating an input beam comprising a train of pulses; decomposing the input beam into multiple frequency components directed along multiple optical paths; modulating the phase and amplitude of the multiple frequency components of the input beam; amplifying the multiple frequency components in respective multiple power amplifiers connected in the respective optical paths; recombining the multiple frequency components in a dispersive element arranged to disperse light from the multiple optical paths along a single output optical axis, as a single amplified composite output beam; and controlling the modulating step to produce desired properties in the amplified composite output beam.

It will be appreciated from the foregoing summary that the present invention represents a significant advance in high-energy optical sources. In particular, the invention provides the ability to synthesize a desired output waveform from amplified components of different frequencies. For specific applications, the output may be switched between "on" and "off" states. Other aspects and advantages of the invention will become apparent from the detailed description below, taken in conjunction with the accompanying drawings

BRIEF DESCRIPTION OF THE DRAWINGS

FIG. 5 is a graph showing a typical train of output pulses from the device of the invention as applied in ON/OFF keying of an optical source for application to infrared countermeasures (IRCM).

DETAILED DESCRIPTION OF THE INVENTION

Figure 1:
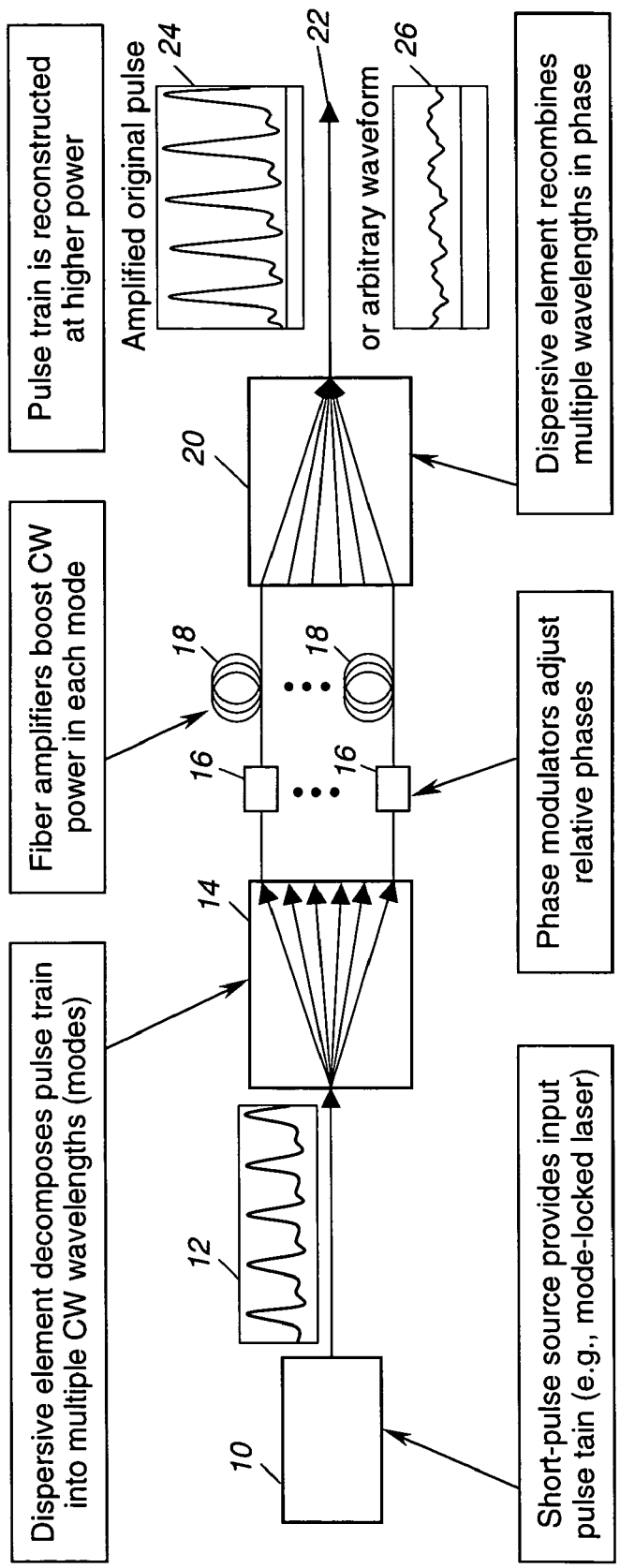
FIG. 1 is a simplified block diagram showing the principal components of the invention.

As shown in the drawings for purposes of illustration, the present invention is concerned with the generation of high-energy optical radiation with a desired waveform, the nature of which is application dependent. For example, optical remote sensing and applications such as infrared/optical countermeasures require modulated waveforms of optical pulse trains. Conventional techniques use amplitude modulation schemes in which a laser beam intensity is varied over time to achieve the desired waveforms. Electro-optic modulation (EOM) and acousto-optic modulation (AOM) are examples of these techniques. EOM provides modulation rates of up to tens of gigahertz (GHz), and AOM operates typically in the range of tens of megahertz (MHz). Choice of materials and device dimensions limits use of these devices to certain wavelength regions and power levels. Also, these high-energy arbitrary waveform sources inherently suffer from low electrical efficiencies.

In accordance with the invention, high-energy optical waveforms and pulse trains are generated at modulation rates, wavelength ranges, and power levels beyond the limitations imposed by currently available techniques and materials. In brief, the method of the invention is based on synthesizing optical pulse trains and waveforms by coherently combining multiple continuous-wave (CW) laser beams with a set of discrete optical frequencies. Adjusting the relative phases of each laser beam having particular frequency components yields a choice of arbitrary optical pulses and waveforms, as mathematically governed by Fourier series synthesis. For example, combining multiple beams having a set of equally spaced comb of frequencies, with all the phases set to the same reference phase, produces a train of short pulses, that is, a mode-locked pulse train. When the phases are set to other values, different waveforms can emerge as a result of coherent summation of the radiation fields within the combined laser beam. This process allows the generation and control of the optical modulation envelope by Fourier synthesis, and a device having such capability may be termed a Fourier-optic modulator (FOM).

FIG. 1 depicts a simplified embodiment of the invention, showing its principal elements. A short-pulse optical source, such as a mode-locked laser (MLL), indicated by reference numeral 10, generates an input pulse train, as indicated at 12. The input pulse train is input to a first dispersive element 14, which decomposes the pulse train into multiple continuous-wave (CW) wavelengths or modes. Multiple outputs from the first dispersive element 14 are coupled to an equal number of phase modulators 16, which are controlled in accordance with the invention to provide a desired composite output signal. The outputs of the modulators 16 are coupled to an equal number of fiber amplifiers 18, which boost the CW power in each mode. The outputs of the fiber amplifiers 18 are re-combined in a second dispersive element 20 and yield the composite output signal on optical line 22. As indicated by the waveform at 24, the phases of the individual modes may be selected to provide an output waveform that is an amplified version of the original pulse train shown at 12. Alternatively, the phase modulators 16 may be so adjusted as to produce a desired arbitrary waveform, as indicated at 26, with no significantly amplified peaks.

Figure 2:
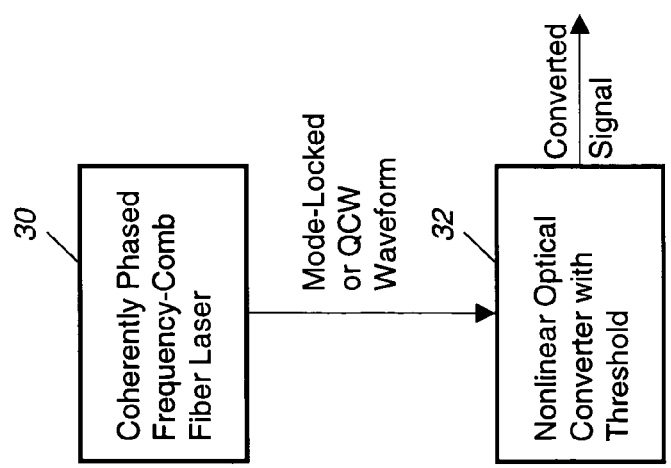
FIG. 2 is a block diagram showing the invention as used in a specific application in combination with a nonlinear optical converter.

The ability to produce either mode-locked output waveform, such as that shown at 24, or an arbitrary waveform without peaks, such as that shown at 26, is of high importance in applications such as infrared countermeasures, which ideally require an output that can be switched on and off between high-energy peaks and a practically zero output. Given the apparatus of the invention, this objective can be accomplished as shown in FIG. 2. Block 30 represents a coherently phased frequency-comb fiber laser device, of the type depicted in FIG. 1. The output, on optical line 22, is either a highly amplified mode-locked waveform, or an arbitrary waveform without peaks, which will be referred to as a quasi-continuous-wave (QCW) output. The desired contrast between these two types of output signals is further enhanced by coupling the output signal to a nonlinear optical converter 32, which may, for example, effect frequency conversion by means of an optical parametric oscillator. In any event, the optical converter 32 functions as a thresholding device, and blocks transmission of energy below a selected threshold level.

Figure 3:
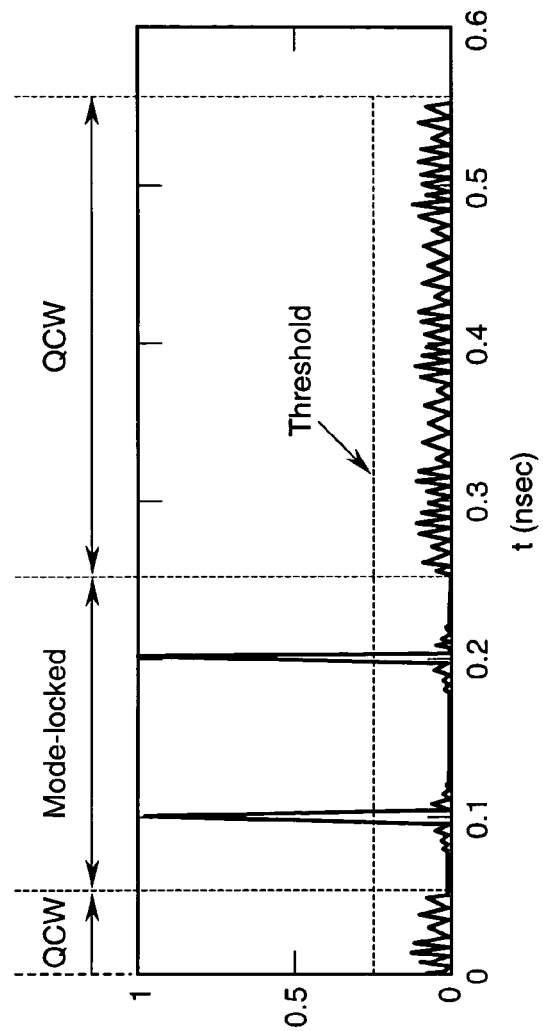
FIG. 3 is a graph showing the output of the device of the invention, as switched between mode-locked operation and quasi-continuous-wave (QCW) operation.
Figure 4:
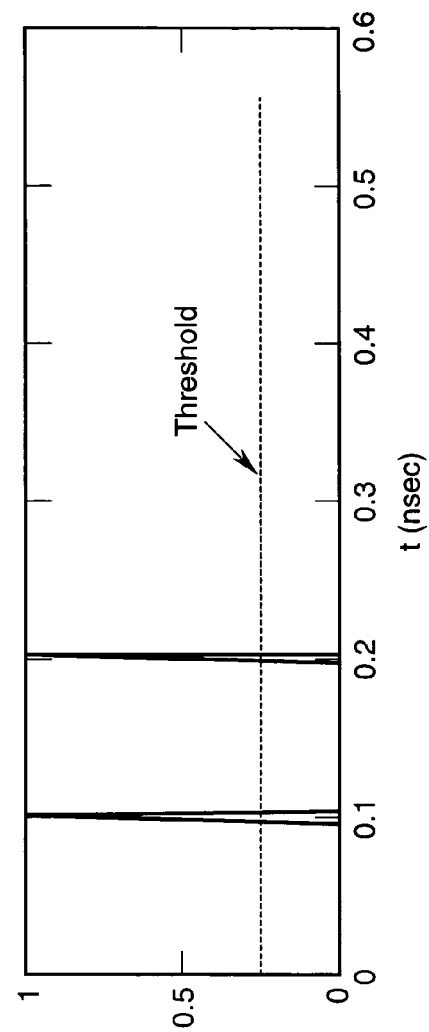
FIG. 4 is a graph showing how the output depicted in FIG. 3 is affected by processing in the nonlinear optical converter of FIG. 2.

FIG. 3 is a graph showing how the output signal on line 22 might vary with time, alternating between mode-locked operation and QCW operation. In mode-locked operation, the output on line 22 is a pulse train with a succession of well defined peaks. In QCW operation, the output on line 22 has no significant peaks and includes an arbitrary waveform with peak values many times lower that the peaks produced during mode-locked operation. The nonlinear optical converter 32 interposes a threshold, indicated by a dotted line in FIG. 3. Therefore, because the waveform in QCW operation falls entirely below the threshold, the nonlinear optical converter 32 produces an output on line 34 as illustrated in the graph of FIG. 4, including the high-energy peaks when during mode-locked operation and an essentially zero signal when mode-locked operation is switched off. Therefore, the invention provides a high-energy output signal that may be turned on or off as desired.

FIG. 5 is a graph that depicts in more general form a desired on/off keyed high-energy source, such as may be used for infrared countermeasures (IRCM). The graph shows trains of individual pulses (the vertical lines) and the envelopes of the pulse trains. The pulse trains are separated by selected "off" intervals, produced with a set of phases chosen to produce a near constant, lower level, optical power, which is then further suppressed by the nonlinear optical converter 32 (FIG. 2).

In theory the width of a pulse produced in mode-locked mode is given by $\delta t = \Delta T/M$, where $\Delta T$ is the period of the pulses and M is the number of modes. The peak intensity in mode-locked operation is M times the average intensity. Therefore, the average power over time $\Delta T$ is M times higher during the ON state (mode-locked) than it is in the OFF state (QCW).

Figure 6:
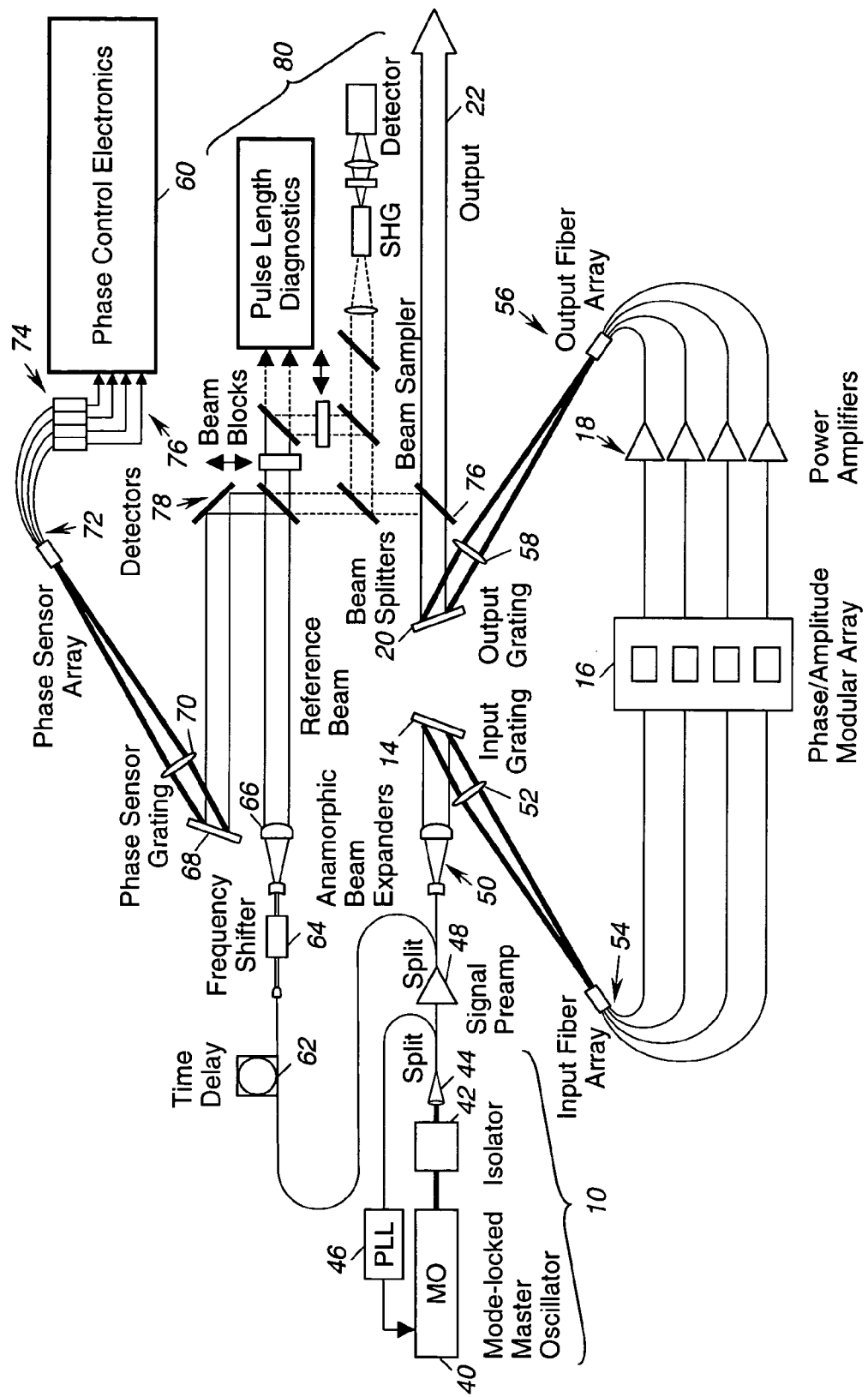
FIG. 6 is schematic diagram of the device of the invention.

FIG. 6 is a more detailed diagram of the optical source of the invention. The lower part of the figure, including the short-pulse source 10, first dispersive element 14, phase modulators 16, fiber amplifiers 18, and second dispersive element 20, are essentially the same as the corresponding elements shown in FIG. 1, producing a composite output on optical line 22. The short-pulse source 10 is shown as including a mode-locked master oscillator 40, an isolator 42, a beam splitter 44 and a phase-locked loop 46. A portion of the output of the short-pulse source 10 is split off in a second beam splitter 48, to be further discussed below. The remainder of the output signal passes through an anamorphic beam expander 50, before impinging on the first dispersive element 14, which may take the form of an optical grating, the effect of which is to produce linear array of multiple beams at different frequencies. These multiple beams are focused by a lens 52 into a fiber array 54, each fiber element of which is coupled through a phase/amplitude modulator 16, and then the phase and amplitude adjusted beams are passed through the power amplifiers 18. The amplifier outputs are coupled to an output fiber array 56, the outputs of which are focused by a lens 58 onto the second dispersive element 20, taking the form of another optical grating. This second grating diffracts each frequency component along a single common optical axis, to provide the output beam 22, consisting of a set of frequency components with independently adjustable phases.

The upper portion of FIG. 6 includes phase control electronics 60 and various other optical and electro-optical elements used to generate appropriate control signals to the phase/amplitude modulators 16. A portion of the original pulse train beam from the short-pulse source 10 is split off by the beam splitter 48 to provide a reference beam, which is passed through a time delay 62, a frequency shifter 64 and an anamorphic expander 66. The reference beam subsequently impinges on another grating 68 and is focused by a lens 70 into an array of fibers 72 coupled to a phase sensor array 74, which outputs signals over lines 76 to the phase control electronics 60. An arrangement of mirrors 78 directs the reference beam onto the grating 68. A beam splitter 76 extracts a sample from the output beam 22 and the mirrors 78 direct this sample output beam onto the same grating 68.

The control and adjustment of the relative phases of the component beams uses heterodyne optical measurement of the relative phase of each frequency component. The reference beam from the master oscillator 40 is frequency shifted by a heterodyne beat frequency, using the frequency shifter 64. The shifted reference beam is grating 68 disperses the sampled output beam and the frequency-shifted reference beam in such a way that the corresponding frequency components produce interference signals on the array of photo-detectors 74. Each detector output signal is mixed with a reference beat frequency signal and generates an electronic phase shift signal. The phase control electronics 60 process these phase shift signals to generate drive signals that adjust the respective phase modulators 16. This procedure creates a set of phases for each frequency component by feedback control, until the procedure converges to a particular set of values as determine by the phase control electronics settings. Therefore, the adjustment method provides an electronic means to control and synthesize any optical waveform.

The arrangement described in the previous paragraph for sensing phase shifts between the input and output of the device of the invention is derived in part from the teachings of U.S. Pat. No. 6,229,616, entitled "Heterodyne Wavefront Sensor," and U.S. Pat. No. 6,366,356, entitled "High Average Power Fiber Laser System With High-Speed, Parallel Wavefront Sensor," both invented by Stephen J. Brosnan et al. In essence, the arrangement of components provides a measure of phase shift from input to output, for each of the frequency components of the composite beam. When mode-locked operation is desired, the phase control electronics 60 functions to preserve the relative phase relationships of the beam components, so that the output beam waveform is an amplified version of the original waveform. For operation in the quasi-continuous-wave (QCW) mode, the phase control electronics 60 functions to deliberately disturb the original phase relationships of the frequency components in such a way that the components do not combine to produce significant peaks.

Although the invention has been described for the most part as producing two alternative output waveforms, one of which is an amplified form of the original and the other of which is a relatively low-amplitude constant wave, it will be understood that the phase control electronics 60 may be configured to produce any desired output waveform, utilizing principles of Fourier synthesis. In accordance with the general principles of the invention, the original waveform is divided into frequency components, which are separately controllable in phase and amplitude before being recombined. Therefore, by appropriate control of the phases and amplitudes of the frequency components, an amplified optical signal of any desired waveform may be generated, within the constraints of Fourier synthesis.

Other components shown in FIG. 6, including pulse length diagnostics and related optical elements, are used for experimental and diagnostic purposes and are not important to the general principles of the invention.

It will be appreciated from the foregoing description that the present invention represents a significant advance in the field of high-energy optical sources. In particular, the invention provides a much more efficient technique for generating an amplified optical output with a desired waveform. For the specifically described embodiment, the optical output may be switched between an "on" state in which the output comprises a train of narrow peaks and an "off" state in which the output comprises low-level radiation that can reduced to practically zero with use of an optical thresholding device. It will also be appreciated that the present invention may be easily modified to encompass embodiments not specifically illustrated and described. Accordingly, the invention should not be limited except as by the appended claims.

What is claimed is:

1. A high-energy optical source capable of producing any desired waveform, comprising:
    a source of input laser pulses;
    a first dispersive element, for decomposing the input laser pulses into multiple frequency components directed along multiple optical paths;
    multiple phase and amplitude modulators connected in the respective optical paths;
    multiple power amplifiers connected in the respective optical paths;
    a second dispersive element coupled to receive amplified optical signals from multiple power amplifiers and arranged to disperse light from the multiple optical paths along a single output optical axis, as a single amplified composite output beam; and
    means for controlling the multiple phase and amplitude modulators to produce desired properties in the amplified composite output beam;
    wherein the means for controlling the multiple phase and amplitude modulators comprises:
        a first beam sampler, for obtaining a first sample from the input laser pulses;
        a second beam sampler, for obtaining a second sample from the amplified composite output beam;
        means for frequency shifting one of the first and second samples;
        a third dispersal element, for decomposing the first and second samples into multiple frequency components;
        a sensor array coupled to receive both of the frequency-decomposed sample beams and to generate as a result electrical output signals indicative of relative phases of the frequency-decomposed sample beams; and
        control electronics for processing the output signals from the sensor array and generating a set of control signals coupled to the phase and amplitude modulators.

2. A high-energy optical source as defined in claim 1, wherein the source of input laser pulses comprises a mode-locked master oscillator.

3. A high-energy optical source as defined in claim 1, wherein the first and second dispersive elements comprise optical gratings.

4. A high-energy optical source as defined in claim 1, wherein the control electronics are switchable to generate phase control signals of first and second types, wherein the control signals of the first type are effective to maintain the same phase relationships among the output signal components as exist among the input signal components, to produce an amplified output signal of the same waveform shape as the input signal, and the phase control signals of the second type are effective to disturb the phase relationships that exist among the input signal components and produce an output signal that is relatively low in amplitude.

5. A high-energy optical source as defined in claim 4, and further comprising a nonlinear optical converter coupled to receive the output signal, wherein the converter effectively suppresses the output signal when the phase control signals are of the second type.

6. A high-energy optical device, controllable to operate alternately in an "on" mode that generates a train of high-energy pulses and an "off" mode in which the high-energy pulses are suppressed, the optical device comprising:
    a mode-locked laser for generating a continuous train of optical pulses in an input beam;
    a first dispersive element, for decomposing the input beam into multiple frequency components coupled along multiple optical paths;
    multiple phase modulators contacted in the respective optical paths;
    multiple power amplifiers connected in the respective optical paths;
    a second dispersive element coupled to receive amplified optical signals from the multiple power amplifiers and arranged to disperse light from the multiple optical paths along a single output optical axis, as an amplified composite output beam;

means for controlling the multiple phase modulators to switch between an "on" mode in which the mode-locked laser train of pulses is amplified and reproduced in the output beam, and an "off" mode in which the mode-locked train of pulses is effectively suppressed by appropriately disturbing in the output beam the relative phase relationships that existed among the frequency components of the input beam; and a nonlinear optical converter coupled to receive the output beam and to suppress by thresholding any signals output during the "off" mode of operation.

7. A method for generating a high-energy optical beam of any desired waveform, the method comprising:

generating an input beam comprising a train of pulses;

decomposing the input beam into multiple frequency components directed along multiple optical paths;

modulating the phase and amplitude of the multiple frequency components of the input beam;

amplifying the multiple frequency components in respective multiple power amplifiers connected in the respective optical paths;

recombining the multiple frequency components in a dispersive element arranged to disperse light from the multiple optical paths along a single output optical axis, as a single amplified composite output beam; and controlling the modulating step to produce desired properties in the amplified composite output beam;

wherein the step of controlling the multiple phase and amplitude modulators comprises:

using a first beam sampler to obtaining a first sample from the input laser pulses;

using a second beam sampler to obtain a second sample from the amplified composite output beam;

frequency shifting one of the first and second samples;

decomposing the first and second samples into multiple frequency components;

focusing both of the frequency-decomposed sample beams on sensor array;

generating in the sensor array electrical output signals indicative of relative phases of the frequency-decomposed sample beams; and processing the output signals from the sensor array in control electronics, and generating a set of control signals to control the modulating step.

8. A method as defined in claim 7, and further comprising: switching the control electronics to generate phase control signals of first type and second types, wherein the control signals of the first type are effective to maintain the same phase relationships among the output signal components as exist among the input signal components, to produce an amplified output signal of the same waveform shape as the input signal, and the phase control signals of the second type are effective to disturb the phase relationships that exist among the input signal components and produce an output signal that is relatively low in amplitude.

9. A method as defined in claim 8, and further comprising applying the output signal to a nonlinear optical converter, wherein the converter effectively suppresses the output signal when the phase control signals are of the second type.

10. A high-energy optical source capable of producing any desired waveform, comprising:

a source of input laser pulses;

a first dispersive element, for decomposing the input laser pulses into multiple frequency components directed along multiple optical paths;

multiple phase and amplitude modulators connected in the respective optical paths;

multiple power amplifiers connected in the respective optical paths;

a second dispersive element coupled to receive amplified optical signals from multiple power amplifiers and arranged to disperse light from the multiple optical paths along a single output optical axis, as a single amplified composite output beam; and means for controlling the multiple phase and amplitude modulators to produce desired properties in the amplified composite output beam, wherein this means comprises beam sampling means, for obtaining a first sample beam from the input laser pulses and a second sample beam from the amplified composite output beam;

means for decomposing the first and second sample beams into multiple frequency components;

a sensor array coupled to receive both of the frequency-decomposed sample beams and to generate as a result electrical output signals indicative of relative phases of the frequency-decomposed sample beams; and control electronics for processing the output signals from the sensor array and generating a set of control signals coupled to the phase and amplitude modulators.

* * * * *